(12) United States Patent
Johnson

(10) Patent No.: US 7,842,884 B2
(45) Date of Patent: Nov. 30, 2010

(54) DEVICE AND METHOD FOR MOUNTING AN ELECTRICAL BOX IN DRYWALL

(76) Inventor: Richard A. Johnson, 3188 Pluto Cir., North Fort Myers, FL (US) 33903-1104

( * ) Notice: Subject to any disclaimer, the term of this patent is extended or adjusted under 35 U.S.C. 154(b) by 0 days.

(21) Appl. No.: 12/349,765

(22) Filed: Jan. 7, 2009

(65) Prior Publication Data

US 2010/0170711 A1     Jul. 8, 2010

(51) Int. Cl.
*H01H 9/02*     (2006.01)
(52) U.S. Cl. .................. 174/58; 174/503; 174/480; 174/61; 174/63; 248/300; 52/317
(58) Field of Classification Search .......... 174/480, 174/481, 58, 54, 61, 63, 503; 248/300, 343; 52/317
See application file for complete search history.

(56) References Cited

U.S. PATENT DOCUMENTS

| | | | |
|---|---|---|---|
| 2,990,172 A | 6/1961 | Gianotta | |
| 4,012,580 A | 3/1977 | Arnold | |
| 4,950,840 A | * 8/1990 | Zetena | ............ 174/66 |
| 4,951,395 A | 8/1990 | Lameiro | |
| 5,600,093 A | 2/1997 | Herth et al. | |
| 5,696,350 A | 12/1997 | Anker | |
| 5,813,130 A | 9/1998 | MacDowell | |
| 6,005,189 A | 12/1999 | Anker | |
| 6,147,304 A | 11/2000 | Doherty | |
| 6,800,806 B1 | 10/2004 | Grday | |
| 7,034,222 B1 | 4/2006 | York | |
| 7,179,995 B2 | 2/2007 | Dinh | |
| 7,312,395 B1 | 12/2007 | Gretz | |
| 2006/0102371 A1 | 5/2006 | Reynolds | |
| 2007/0151972 A1 | 7/2007 | Denier | |
| 2008/0041848 A1 | 2/2008 | Denier | |
| 2008/0047731 A1 | 2/2008 | Krueger et al. | |

FOREIGN PATENT DOCUMENTS

| | | |
|---|---|---|
| CA | 2 296 151 | 7/2001 |
| WO | WO01/56048 | 8/2001 |
| WO | WO2005/124054 | 12/2005 |

* cited by examiner

*Primary Examiner*—Dhiru R Patel
(74) *Attorney, Agent, or Firm*—Thomas J. Schab

(57) ABSTRACT

A device and method for mounting electrical boxes (1) in preexisting drywall (4) using a mounting bracket (3). To use, a holding wire (14) having a stop (15) on one end is placed through a screw hole (9) of a cover (2) which is attached the electrical box. Then the electrical box and cover are placed sideways through a wall hole (7) in the drywall. Next the electrical box is lowered behind the wall so that conduit (8) may be connected to the electrical box. Then a mounting bracket (3) is secured to the cover and electrical box with holding clips (11) and screws (12) using the holding wire to keep the mounting bracket and cover centered with the wall hole. A standard switch or outlet cover may then be installed to cover the mounting bracket. An additional novel feature of the present invention is a stop strap (17) which may be attached to conduit above a top plate (10) of a wall to bold the conduit in place.

18 Claims, 4 Drawing Sheets

DEVICE AND METHOD FOR MOUNTING AN ELECTRICAL BOX IN DRYWALL

BACKGROUND OF THE INVENTION

This invention relates to electrical boxes used to house electrical switches, outlets and/or other receptacles, more particularly a device and method for mounting an electrical box in pre-existing drywall.

Currently, when an electrician needs to install an electrical box for a new switch or outlet in an existing wall, the electrician normally uses a gem box. A gem box measures 2"×3" which does not allow an electrician to reach into the wall to retrieve conduit. To install a gem box, the electrician cuts a hole the same size as the gem box into drywall and then places the gem box into the hole. The gem box may be held in place by brackets on the top and bottom of the gem box which lay flat against the outer surface of the dry wall and have holes for screws. Alternatively, the gem box may be held in place by brackets on the sides of the gem box which clamp against the inner surface of the drywall when screws passing through the brackets are tightened. Both of these methods pose problems because they don't create a strong connection with the drywall meaning that over time the gem boxes may become loose or completely separated from the drywall.

An additional problem posed by the use of gem boxes is that their size limits the electrical connections which may be made to the gem boxes and how they are made. For example, if an electrician needs to install a new switch in a wall for a ceiling fan, the electrician would have to run a line coming from a breaker panel through the top of the gem box and then a line going to the ceiling fan through the side of the gem box. This can be tedious and time consuming because of the size of the gem box. Additionally, if the electrician needs to install two switches next to each other, then two gem boxes need to be connected to each other to form a larger electrical box. Electricians would prefer to use 4"×4" electrical boxes instead of gem boxes because they are more stable and provide more room inside of them for wires and connections as well as punch outs for running lines in and out of the 4"×4" electrical boxes, but because of their size electricians have been unable to install 4"×4" electrical boxes without removing large pieces of drywall so that the 4"×4" electrical boxes can be secured to studs.

Thus, a need exists for a device and method for mounting an electrical box in drywall which allows a user to mount a 4"×4" electrical box behind pre-existing drywall.

The relevant patents of prior art includes the following references:

| Patent/Ser. No. | Inventor | Issue/Publication Date |
| --- | --- | --- |
| 2008/0047731 | Krueger, et al. | Feb. 28, 2008 |
| 2008/0041848 | Denier | Feb. 21, 2008 |
| 7,312,395 | Gretz | Dec. 25, 2007 |
| 2007/0151972 | Denier | Jul. 05, 2007 |
| 7,179,995 | Dinh | Feb. 20, 2007 |
| 2006/0102371 | Reynolds | May 18, 2006 |
| 7,034,222 | York | Apr. 25, 2006 |
| WO2005/124054 | Lennox | Dec. 29, 2005 |
| 6,800,806 | Grday | Oct. 05, 2004 |
| WO01/56048 | Baldwin | Aug. 02, 2001 |
| CA 2 296 151 | Follet | Jul. 12, 2001 |
| 6,147,304 | Doherty | Nov. 14, 2000 |
| 6,005,189 | Anker | Dec. 21, 1999 |
| 5,813,130 | MacDowell | Sep. 29, 1998 |
| 5,696,350 | Anker | Dec. 09, 1997 |
| 5,600,093 | Herth, et al. | Feb. 04, 1997 |
| 4,951,395 | Lameiro | Aug. 28, 1990 |
| 4,012,580 | Arnold | Mar. 15, 1977 |
| 2,990,172 | Gianotta | Jun. 27, 1961 |

SUMMARY OF THE INVENTION

The primary object of the present invention is to provide a device and method for mounting an electrical box in drywall which allows a user to easily mount a 4"×4" electrical box behind pre-existing drywall.

Another object of the present invention is to provide a device and method for mounting an electrical box in drywall which allows a user to mount a 4"×4" electrical box behind pre-existing drywall without having to secure the electrical box to a stud.

A further object of the present invention is to provide a device and method for mounting an electrical box in drywall which allows a user to secure a preexisting 4"×4" electrical box, which has become loose over time, to drywall.

Another object of the present invention is to provide a device and method wherein a hole cut into drywall to mount a 4"×4" electrical box is large enough for a user to pass his/her hand through to retrieve conduit.

A further object of the present invention is to provide a device and method for mounting an electrical box in drywall which allows a user to run conduit to an electrical box without the assistance a second person.

The present invention fulfills the above and other objects by providing a mounting bracket made of a metal plate having a cut out in the center for electrical switches, outlets and/or other receptacles to pass through, said bracket having holding clips for temporarily holding the mounting bracket against a cover that is attached to the electrical box. The bracket also includes screw holes for securing the mounting bracket to screw holes in said cover with screws. To use, a U-shaped piece of wire having a stop on one end is placed through a screw hole in the cover which is attached to the an open front of the 4"×4" electrical box. Then the 4"×4" electrical box and cover are placed sideways through a wall hole in drywall which is approximately 4"×2" big. Next the 4"×4" electrical box is lowered behind the drywall wall so that the electrician may run conduit to the electrical box and connect the conduit to punch out holes in the 4"×4" electrical box. Then the 4"×4" electrical box is raised and centered with the wall hole. The opposite end of the holding wire is then inserted into the top mounting hole of the mounting bracket from a backside thereof, whereby the mounting bracket is then slid along the holding wire until it is flush against the outer surface of the drywall. The holding clips on the mounting bracket are bent over the cover to hold the mounting bracket in place. When an electrical component is ready to be mounted, a screw is first placed through the component, then through the bottom screw hole of the mounting bracket to secure the component and the mounting bracket to the cover and the 4"×4" electrical box. Then the holding wire is removed from the top screw hole of the cover and mounting bracket and a screw is placed through the top screw hole to secure the mounting bracket it to the cover of the 4"×4" electrical box. The mounting bracket and the cover of the 4"×4" electrical box act as a clamp sandwiching the drywall in-between the two, thereby holding the 4"×4" electrical box in place. A standard switch or outlet cover may then be installed to cover the metal mounting bracket.

The mounting bracket may also be used to secure loose 4"×4" electrical boxes in pre-existing construction which were installed before dry walled was installed. When 4"×4" electrical boxes are installed in new construction, they are secured on one side to a metal or wood stud with screws. Because the 4"×4" electrical boxes are only secured on one side, they may be knocked loose during construction or become loose with time and use. Previously the only way to fix this problem was to cut out a large piece of drywall to gain access to the 4"×4" electrical box. Alternatively, an electrician may now secure a mounting bracket to the cover of the 4"×4" electrical box with screws thereby sandwiching the drywall in-between the two and securing the 4"×4" electrical box in place.

An additional novel feature of the present invention is a stop strap which may be attached to conduit above a top plate of a wall to temporarily hold the conduit in place to prevent excess conduit from slipping behind the wall while running the conduit to an electrical box from an attic. Additionally, after conduit has been secured to an electrical box, any excess slack is taken out of the conduit and the conduit may then be permanently secured to the top plate using the stop strap and a screw. By using a stop strap while running conduit to an electrical box, an electrician can eliminate the need for a second pair of hands because normally a second person would have to feed conduit down to an electrical box and hold the conduit in place until the conduit is attached to the electrical box. Conduit is a solid or flexible metal or other tubing which may or may not have crests and troughs through which insulated electric wires are run.

Although the present invention described herein describes a device and method for mounting an electrical box in drywall, the device and method may be used to mount an electrical box in a variety of wall coverings or materials.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
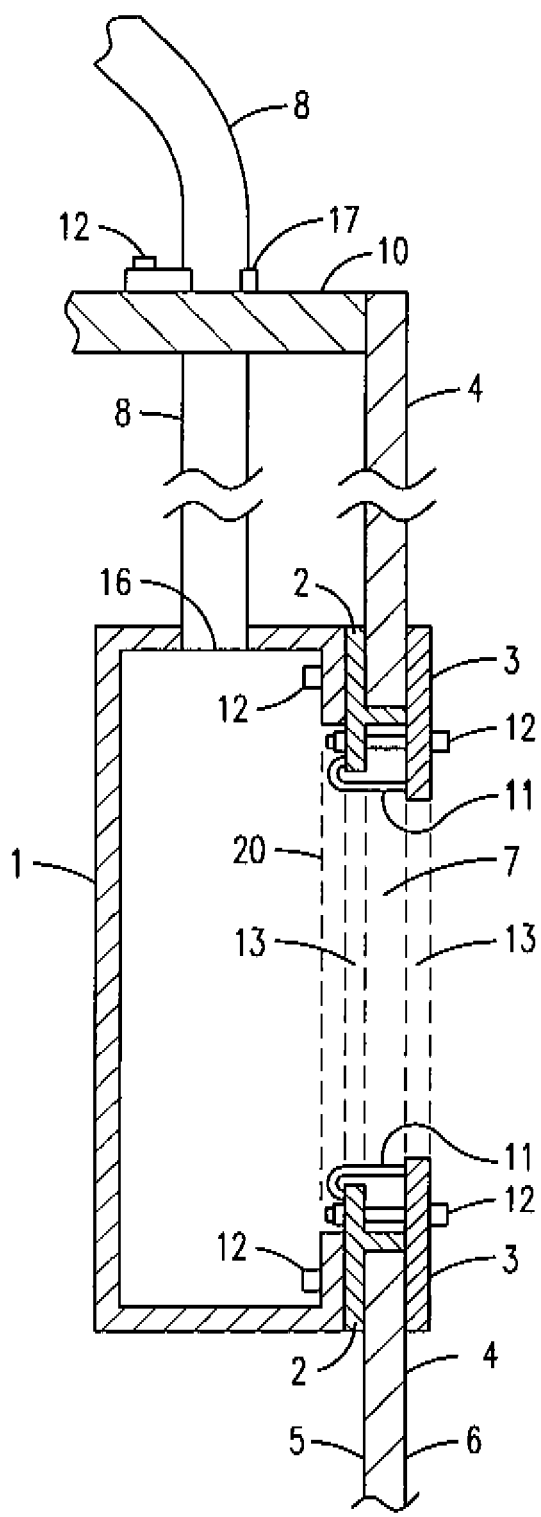
FIG. 1 is a side partial cutaway plan view of mounting bracket and electrical box of the present invention mounted in drywall.

For purposes of describing the preferred embodiments the terminology used in reference to the numbered components in the drawings is as follows:

1. electrical box
2. cover
3. mounting bracket
4. drywall
5. inner surface hole
6. outer surface
7. wall hole
8. conduit
9. screw hole
10 top plate
11. holding clip
12. screw
13. cutout bracket
14. holding wire
15. stop
16. knockout
17. stop strap
18. open end
19. closed end
20. open front
21. measure wall hole
22. cut wall hole
23. attach cover to electrical box
24. remove knock out holes
25. attach holding wire to cover
26. place electrical box through wall
27. lower electrical box in wall
28. measure conduit
29. run conduit to electrical box
30. attach stop strap
31. attach conduit to electrical box
32. repeat steps 28-31 as necessary
33. attach holding wire to mounting
34. center electrical box
35. bend holding clips
36. insert bottom screw
37. remove holding wire
38. insert top screw
39. shorten slack in conduit
40. reposition top stop strap
41. secure stop strap to top plate Referring now to the drawing figures, FIG. 1 depicts a side partial cutaway plan view of a mounting bracket 3 and electrical box 1 of the present invention mounted in drywall 4. The electrical box 1 has an open front 20 and is attached to a cover 2 by at least one screw 12. The cover 2 has a cut out 13 to allow for an electrical switch and/or electrical outlet to be mounted in the electrical box 1. The cover 2 rests against an inner surface 5 of the drywall 4 while the mounting bracket 3 rests against the outer surface 6 of the drywall 4. The mounting bracket 3 has a cut out 13 in the center to allow for an electrical switch and/or electrical outlet to be mounted in the electrical box is attached to the cover 2 using at least one screw 12. Holding clips 11 help hold the mounting bracket 3 in place in a wall hole 7. The mounting bracket 3 is also attached to the cover 2 by at least one screw 12. When the mounting bracket 3 and cover 2 are secured together, both act as a clamp sandwiching the drywall 4 and thereby securing the mounting bracket 3, cover 2 and electrical box 1 to the drywall 4. A conduit 8 is attached to the electrical box 1 at a knock out hole 16. If conduit 8 is being run vertically through a top plate 10 of a wall, as shown here in FIG. 1, then the conduit 8 may be secured to the top plate 10 using a stop strap 17, which is described further in relation FIG. 3.

Figure 2:
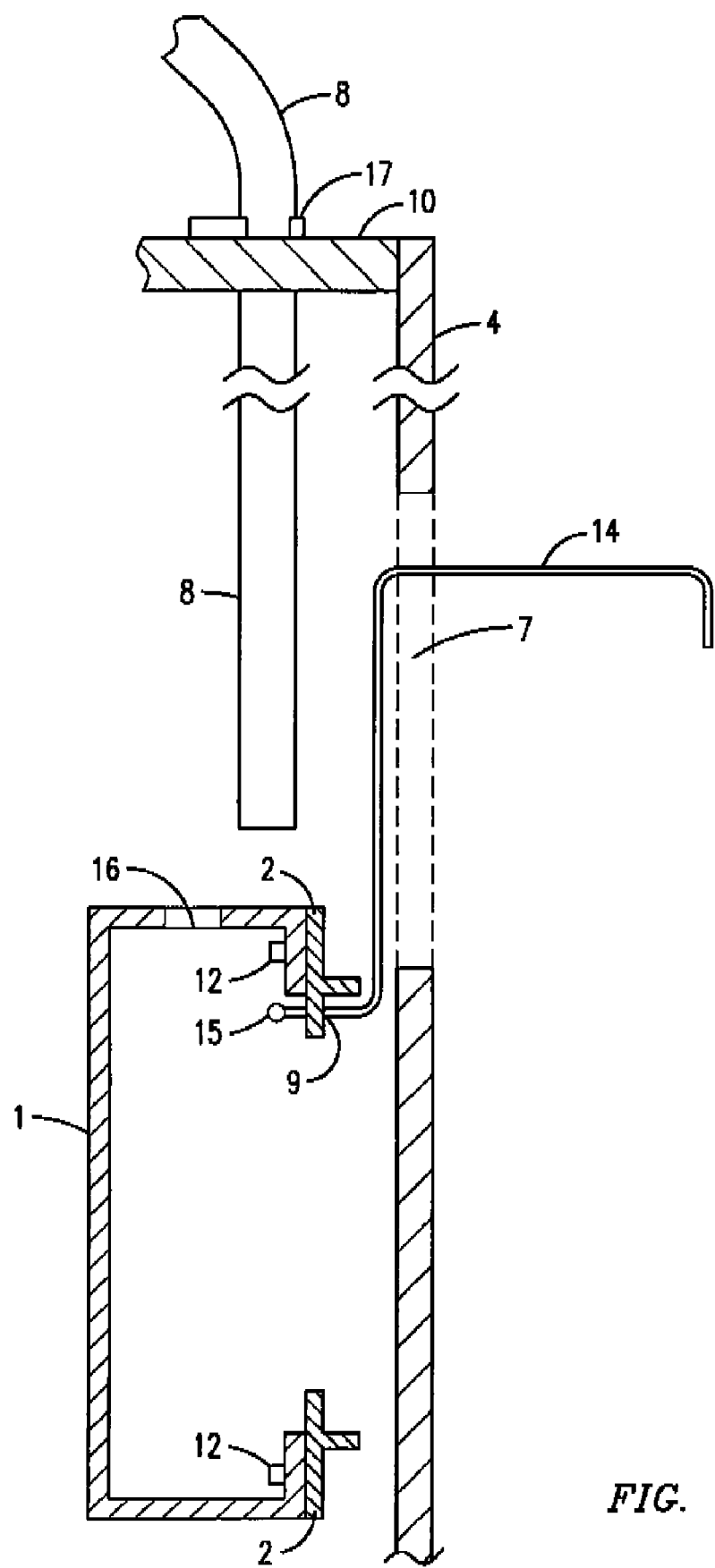
FIG. 2 is a side view of an electrical box, cover and holding wire of the present invention being mounted in drywall.

Now referring to FIG. 2, a side view of an electrical box 1, cover 2 and holding wire 14 of the present invention being mounted in drywall 4 is shown. The electrical box 1 has an open front 20 where a cover 2 is attached by at least one screw 12. A U-shaped holding wire 14 may be placed through a screw hole 9 located in the cover 2. The holding wire 14 has a stop 15 on one end to hold the cover 2 in place. A user may then place the electrical box 1 and cover 2 sideways through a wall hole 7 in the drywall 4 and use the holding wire 14 to lower the electrical box 1 and cover 2 behind the drywall 4 thereby allowing the user to attach conduit 8 to the electrical box 1 through knockout holes 16 located on the electrical box 1. The conduit 8 may be secured to a top plate 10 using a stop strap 17.

Figure 3:
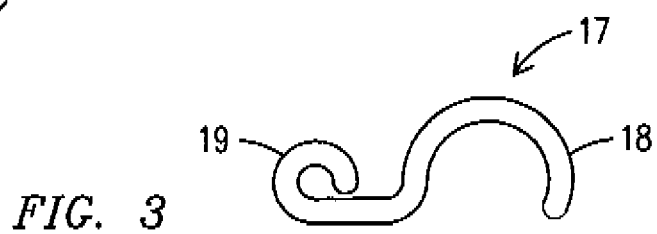
FIG. 3 is a top view of a holding clip of the present invention.

Now referring to FIG. 3, a top view of a stop strap 17 of the present invention is shown. The stop strap 17 has an open end 18 that is C-shaped which attaches to conduit 8 and a closed end 19 at the opposite end for permanently attaching the stop strap 17 to a top plate 10. The stop strap 17 will snap onto the conduit 8 to prevent slipping. A user may attach the stop strap 17 to conduit to temporarily hold the conduit 8 in place to prevent the conduit 8 from slipping through a top plate 10 of a wall while the user is mounting an electrical box 1 and attaching conduit 8 to the electrical box 1. Alternatively, after the electrical box 1 has been mounted in drywall 4 and any slack has been taken out of the conduit 8, the user may permanently attach the conduit 8 to the top plate 10 by attaching the stop strap 17 to the top plate 10 by placing a screw 12 through the closed end 19 of the stop strap 17.

Figure 4:
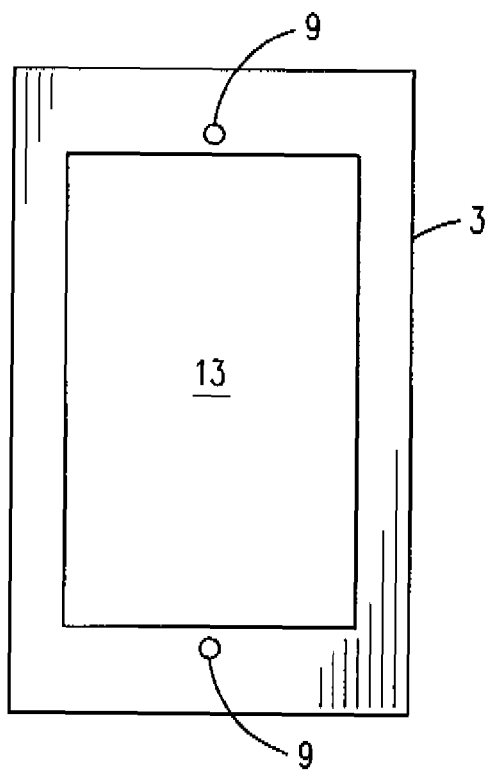
FIG. 4 is a front view of a mounting bracket of the present invention.

Now referring to FIG. 4, a front view of a mounting bracket 3 of the present invention is shown. The mounting bracket 3 has a cut out 13 in the center to allow for receptacles such as electrical switches and/or electrical outlets to pass through. The mounting bracket 3 has two screw holes 9 and may be permanently attached to a cover 2 and electrical box 1 using screws 12. The screw holes 9 may also be used to attach the mounting bracket 3 to a holding wire 14 while mounting an electrical box 1.

Figure 5:
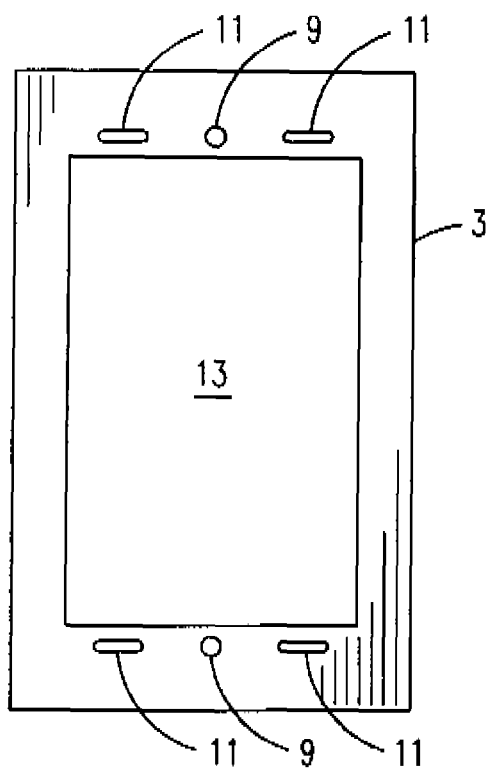
FIG. 5 is a back view of a mounting bracket of the present invention.

Now referring to FIG. 5, a back view of a mounting bracket 3 of the present invention is shown. The mounting bracket 3 has a cut out 13 in the center to allow for receptacles such as electrical switches and/or electrical outlets to pass through. The mounting bracket 3 has two screw holes 9 and may be permanently attached to a cover 2 and electrical box 1 using screws 12. The screw holes 9 may also be used to attach the mounting bracket 3 to a holding wire 14 while mounting an electrical box 1. Holding clips 11 are preferably located at the top and bottom of the mounting bracket 3.

Figure 6:
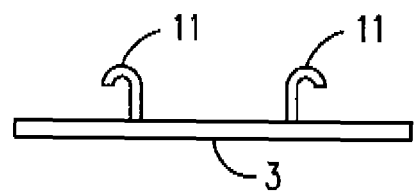
FIG. 6 is a top view of a mounting bracket of the present invention.

Now referring to FIG. 6, a top view of the mounting bracket 3 with holding clips 11 of the present invention is shown. Holding clips 11 are preferably located at the top and bottom of the mounting bracket 3. The holding clips may bent be over a cover 2 thereby holding the mounting bracket 3 in place while permanently securing the mounting bracket 3 to the cover 2. The holding clips 11 also add more stability after an electrical box 1, cover 2 and mounting bracket 3 are mounted in drywall 4.

Figure 7:
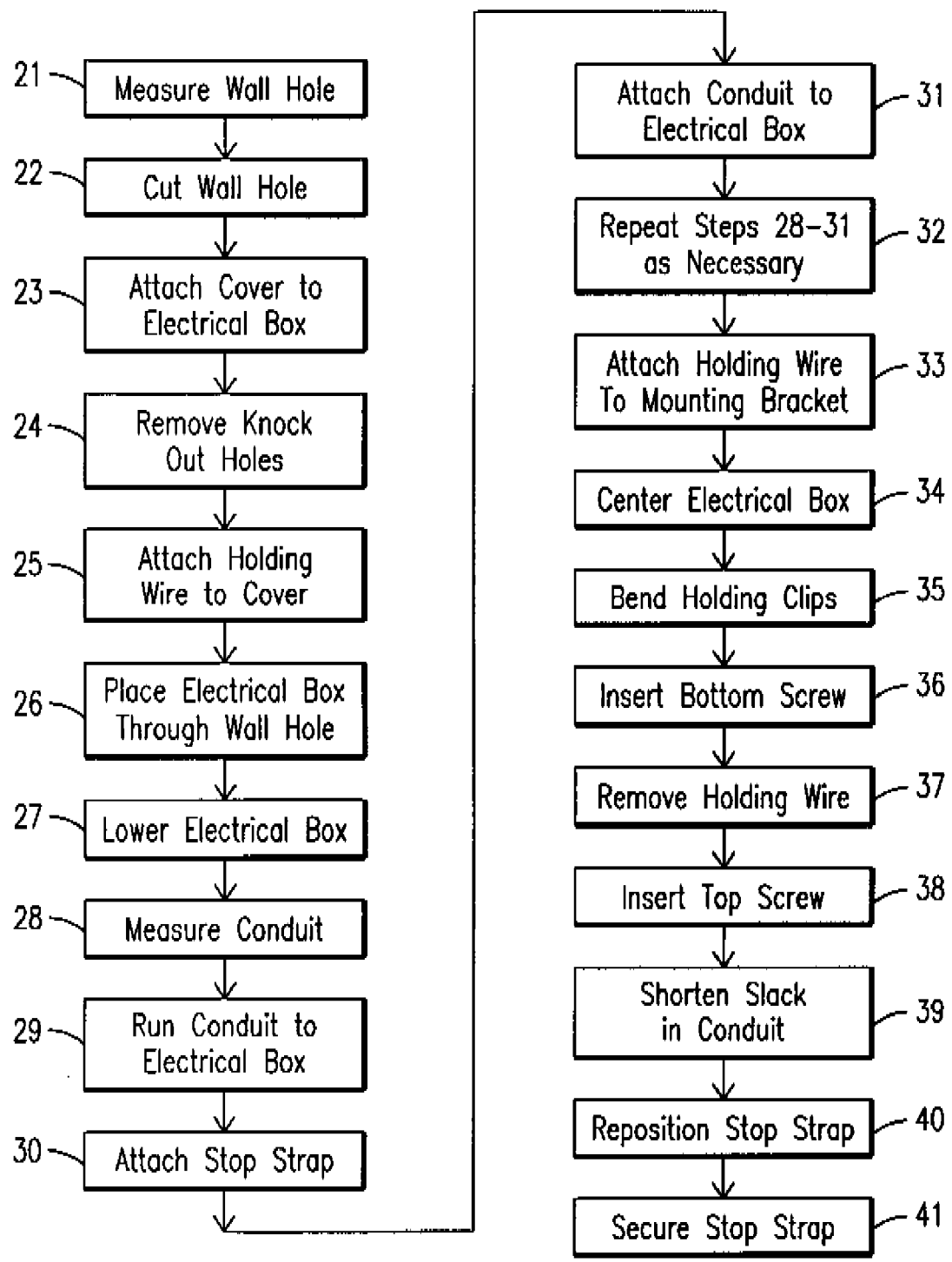
FIG. 7 is a flow chart showing a method for mounting an electrical box in drywall of the present invention.

Now referring to FIG. 7, a flow chart showing a method of the present invention for mounting an electrical box 1 in drywall 4 is shown. First, a user measures and marks lines to cut a wall hole 7 in drywall 21. The height of the wall hole 7 is preferably 2"×4" and may be measured using a mounting bracket 3 as a template. To use a mounting bracket 3 as a template, the user should place the mounting bracket 3 flush against the drywall 4 and mark horizontal lines along the top and bottom of the mounting bracket and vertical lines along a cut out 13 of the mounting bracket 3 so that the height of the wall hole 7 equals the height of the mounting bracket 3 and the width of the wall hole 7 equals the width of the cut out of the mounting bracket 3.

Next, the user cuts the wall hole 7 in the drywall 4, 22. Then, the user attaches a cover 2 to an electrical box 23. Next, the user knocks out knock-out holes on the electrical box as needed for the particular installation being performed 24. Then, the user attaches a holding wire 14 to the cover 2 by placing the holding wire 14 through a screw hole 9 in the cover 2, 25. Next, the electrical box 1 and cover 2 are turned sideways and passed through the wall hole 7, 26. Then, the electrical box 1 and cover 2 are lowered behind the drywall 4 using the holding wire 14 to prevent the electrical box 1 and cover 2 from falling behind the drywall 27. Next, a length of conduit 8 is measured making sure that there is enough excess conduit 8 to work with while attaching the conduit to 8 the electrical box 1, 28. Then, the conduit 8 is passed through a top plate 10 down to the wall hole 7, 29. Next, a stop strap 17 is attached to the conduit 8 above the top plate 10 to prevent any excess conduit 8 from slipping down behind the drywall 4, 30. Then, the conduit 8 is attached to the electrical box 1, 31. Next, steps 28-31 are repeated for each line of conduit 8 that needs to be run to or from the electrical box 1, 32. Then, the mounting bracket 3 is attached to the holding wire 14 by placing the holding wire 14 though a screw hole 9 located in the mounting bracket 3, 33. Next, the electrical box 1 and cover 2 are raised and centered with the wall hole 7 and the mounting bracket 3, 34. Then, holding clips 11 on the mounting bracket 3 are bent to temporarily secure the mounting bracket 3 to the cover 2 and electrical box 1, 35. Next, the mounting bracket 3 and cover 2 are secured together by placing a screw 12 in an open screw hole 9, 36. Then, the holding wire 14 is removed from the cover 2 and mounting bracket 3, 37. Next, the mounting bracket 3 is further secured to the cover 2 with an additional screw 12 through the screw hole 9 which was being used by the holding wire 14, 38. Then, any excess conduit 8 is pulled up through the top plate 10, 39. Next, the stop strap 17 is removed and reattached to the conduit 8 just above the top plate 10, 40. Finally, the stop strap 17 is secured to the top plate 10, 41.

Although a preferred embodiment of a device and method for mounting an electrical box in drywall has been disclosed, it should be understood, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A mounting device for securing an electrical box and a cover within a hole formed in a wall having a top plate, said electrical box having an open front, and sides, said electrical box having a 4"×4" square configuration with screw holes formed therein for securing said cover thereto, said cover for partially covering the open front of said electrical box, said cover having a top, a bottom, a frontside, a backside and a configuration that is substantially coextensive with that of said electrical box, said cover having a centrally located cutout formed therein and screw holes formed therein that are at identical locations to said screw holes in said electrical box for facilitating attachment of said cover to said electrical box by provision of threaded screws, said cover further including a pair of mounting device screw holes formed therein, a respective said mounting device screw hole disposed at said top and said bottom of said cover, said mounting device comprising: a mounting bracket configured as a plate having a top, a bottom, a frontside, a backside, and a centralized cut-out therein for one of an electrical switch and electrical plug to pass therethrough, said mounting bracket having approximately a same width and length as the cover, said mounting bracket having at least one holding clip respectfully located at both said top and bottom of said bracket, said at least one clip for holding said mounting bracket to said cover, whereby when said mounting bracket is secured to said cover, said wall is sandwiched in-between the mounting bracket and the cover, thereby holding the electrical box in said wall.

2. The mounting device of claim 1 wherein said mounting bracket further includes a pair of identical mounting holes, one of said identical mounting holes formed in said top of said mounting bracket and the other of said identical mounting holes formed in said bottom of said mounting bracket, said identical mounting holes for permanently securing said mounting bracket to said mounting device screw holes in said cover by at least one screw.

3. The mounting device of claim 1, further comprising:
a stop strap for securing a length of conduit to a top plate of the wall that said electrical box is mounted within, said stop strap facilitating securement of the conduit to the electrical box that is being held in place by said mounting bracket.

4. The mounting device of claim 3 wherein said stop strap has an open end which attaches to said conduit and said stop strap has closed end for securing the stop strap to said top plate of said wall.

5. The mounting device of claim 1 further comprising:
a holding wire for temporarily holding said electrical box and cover in place within said hole formed in said wall to facilitate attachment of said mounting bracket to said cover.

6. The mounting device of claim 5 wherein said holding wire has a pair of ends and is configured with at least one 90 degree angle bend formed between said pair of ends, said holding wire having a stop formed at one of said ends of said pair of ends, said holding wire capable of insertion through either of said mounting device screw holes of said cover until said stop on said end of said holding wire contacts said cover.

7. The mounting device of claim 1 wherein
said holding wire is discarded after said mounting device is secured to said cover of the electrical box.

8. A method for mounting a 4"×4" electrical box within a hole formed in a wall through the use of a mounting bracket, said wall having a top plate, an outer surface and an inner surface, said electrical box having an open front, sides and a cover for partially covering the open front of said electrical box, said electrical box having a knockout hole formed in one of said sides, said cover having a front and back side and being securable to said electrical box by screws, said cover having a centralized cut out and a pair of mounting holes formed above and below the centralized cut-out in an opposed relationship, and said mounting bracket having a top, a bottom, a frontside, a backside and a centralized cut-out therein for one of an electrical switch and electrical plug to pass therethrough, said mounting bracket having a pair of mounting holes disposed in an opposed relationship to the other, one mounting hole of said pair of mounting holes formed above said centralized cut-out of said mounting bracket near said top and the other mounting hole of said pair of mounting holes formed below said centralized cut-out of said mounting bracket near said bottom, said mounting bracket further having a plurality of holding clips mounted on said backside of said bracket, said clips disposed about said centralized cut-out of said mounting bracket, said method comprising the steps of:
   a. attaching said cover to said electrical box;
   b. positioning said electrical box and cover within the hole formed in the wall so as to center the screw mounting holes of the cover within the hole formed in the wall and such that said knockout hole of said electrical box is facing said top plate of said wall;
   c. attaching said mounting bracket to the cover thereby sandwiching the wall in-between the mounting bracket and the cover such that said electrical box remains positioned within said hole formed in said wall.

9. The method of claim 8 wherein
said mounting bracket can be used as a template to measure the size of the hole to be formed in said wall.

10. The method of claim 8 further comprising the steps of: providing a holding wire after the cover is attached to the electrical box, said holding wire having a pair of ends and a 90° bend formed therein between said pair of holding wire ends, one of the pair of holding wire ends formed with a stop thereon; and then inserting one end of the pair of holding wire ends into one of the mounting holes in the cover until the stop on the other end of the pair of holding wire ends contacts the cover.

11. The method of claim 10 further comprising the steps of: gripping the holding wire while positioning the electrical box and cover within the hole formed in the wall and behind the inner surface of the wall so as to prevent the electrical box from falling into the wall; then manipulating the holding wire so as to center said electrical box within said hole formed in said wall such that said mounting holes in said cover are centered within said hole formed in said wall.

12. The method of claim 11 further comprising the steps of: inserting the one end of the pair of holding wire ends into the top mounting hole of the mounting bracket through the backside of said mounting bracket and then sliding said mounting bracket towards said cover until said backside of said mounting bracket rests against said outer surface of said wall; then inserting a first screw through the bottom mounting hole of said mounting bracket to partially secure the mounting bracket to the cover; removing said holding wire; and then inserting a second screw through the top mounting hole of said mounting bracket so as to draw said mounting bracket towards said cover to completely secure the mounting bracket to the cover, whereby said wall is tightly sandwiched between said cover and said mounting bracket.

13. The method of claim 8 further comprising steps of: providing a pre-measured length of conduit; forming a hole in the top plate of the wall; lowering the pre-measured conduit into the wall through the hole formed in the top plate of the wall; feeding the pre-measured conduit into the knockout hole of the electrical box; and then placing a stop strap on the conduit at a location above the top plate in order to hold the conduit in place at the top plate.

14. The method of claim 13 further comprising the steps of: removing the stop strap; and then repositioning the stop strap on the pre measured conduit at a point where the stop strap rests on the top plate; and then permanently securing the stop strap to the top plate.

15. The method of claim 8 wherein the a steps of: attaching said holding clips of the mounting bracket compromises a flexuring of said holding clips against the cover such that each of the holdings clips temporarily bends so as to allow each of the holding clips to slide over the frontside of the cover and through said centralized cut out of said cover, whereby each of said holding clips flexure to an unbent state, whereby each of said holding clips are held against a backside of the cover.

16. A method for mounting an electrical box within a hole formed in a wall by using a mounting device, said wall having a wall surface and said hole in said wall defined by a edge surface, said hole having a top end and a bottom end, said electrical box having an open front, sides and a cover for partially covering the open front of said electrical box, said cover having a length, a width, a front side and a back side, said mounting device comprising a mounting bracket having approximately a same width and length as the cover which attaches to said cover and holds the electrical box and cover in place within the hole formed in said wall by acting as a clamp with the cover thereby sandwiching the wall in-between the mounting bracket and the cover comprising the steps of:
- a. measuring a 2" wide by 4" tall hole pattern onto said wall surface;
- b. cutting a hole into the wall surface using said hole pattern;
- c. attaching a single gang of cover to a 4"×4" electrical box, said cover having a cut out therein;
- d. removing at least one knockout hole from the electrical box;
- e. attaching a holding wire to an electrical box and cover;
- f. placing the cover and electrical box through the hole formed in the wall;
- g. lowering the electrical box and cover through the hole formed in the wall and behind the wall so that a top surface of the electrical box is flush with said bottom edge of the hole formed in the wall;
- h. measuring a length of conduit;
- i. running the conduit to the hole formed in the wall;
- j. attaching conduit to the electrical box;
- k. attaching said holding wire to the mounting bracket;
- l. centering the electrical box and cover with the hole formed in the wall;
- m. providing said mounting bracket having a centralized cut out therein and a plurality of holding clips attached to a backside of said bracket and then forcibly placing said mounting bracket against said cover so as to flexure and bend said holding clips in order to hold the mounting bracket to the cover;
- n. inserting a first screw to secure the mounting bracket to the cover;
- o. removing the holding wire; and
- p. inserting a second screw to secure the mounting bracket to the cover.

17. The method of claim 16 wherein step a further comprises:
using said mounting bracket as a template to measure a size of said hole.

18. The method of claim 16 further comprising the step of:
using a stop strap to hold the conduit in place.

* * * * *